United States Patent Office 2,901,477
Patented Aug. 25, 1959

2,901,477
STILBENE TETRAZOLE BRIGHTENING AGENTS

Edgar Siegel, Leverkusen, and Heinrich Gold, Koln-Stammheim, Germany, assignors to Farbenfabriken Bayer Aktiengesellschaft, Leverkusen, Germany, a corporation of Germany No Drawing. Application October 2, 1957
Serial No. 687,610

Claims priority, application Germany October 4, 1956

6 Claims. (Cl. 260—240)

It is known to use as brightening agents bluish fluorescent compounds which are colorless to substantially colorless at the concentration generally used for effecting brightening and which contain one or more triazine or triazole rings. Reference may be made inter alia to German Patents Nos. 911,368 and 913,174 as well as to U.S. Patents Nos. 2,719,155 and 2,733,165.

It has now been found that buish fluorescent compounds which are colorless to substantially colorless at the concentration generally used for effecting brightening and which contain one or more tetrazole rings, are likewise very valuable brightening agents.

Especially suitable brightening agents of the proposed type are the stilbene tetrazoles corresponding to the general formula

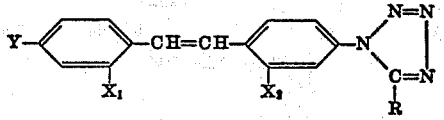

wherein R stands for a hydrogen atom or for an alkyl, aralkyl or aryl radical and wherein $X_1$ and $X_2$ represent independently of each other a hydrogen atom, a solubilizing group such as a sulfonic acid or carboxylic group, a sulfonamide group, an alkyl- or arylsulfone group, a carboxylic acid amide group or the nitrile group, and Y stands for a member of the group consisting of hydrogen, halogen, the nitrile group, an acylamine group or a radical containing triazine, triazole or tetrazole rings which may be substituted.

The following compounds are suitable representatives of the proposed new class of brightening agents:

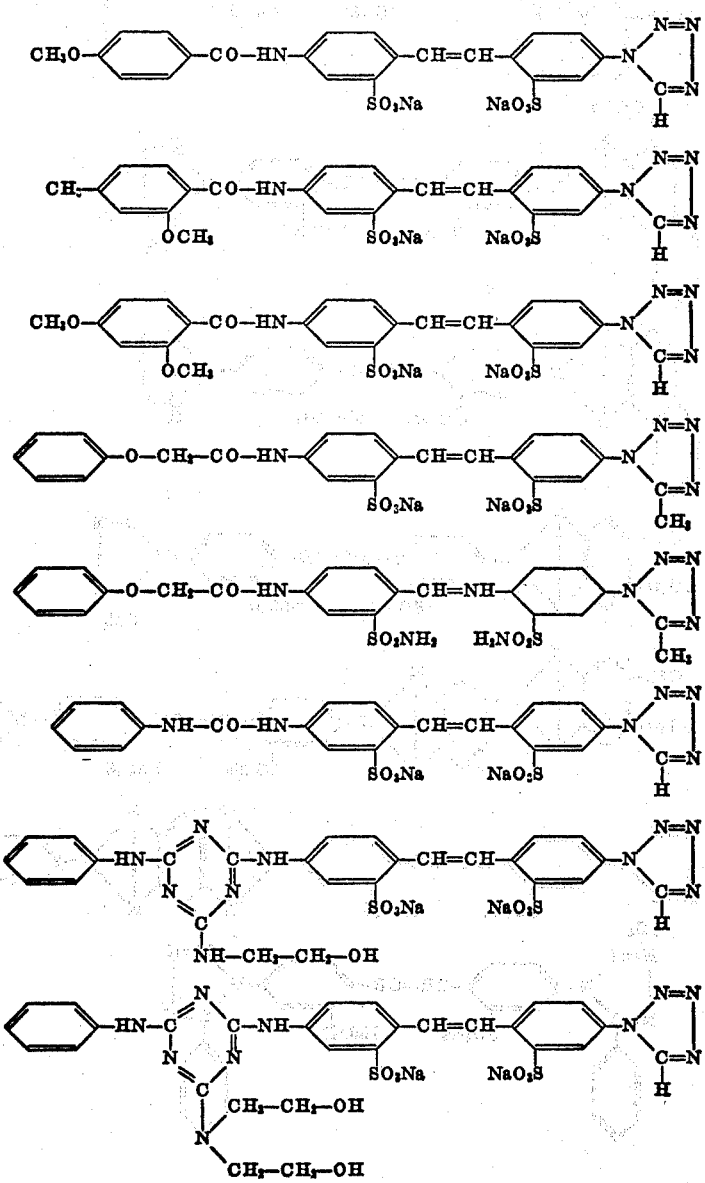

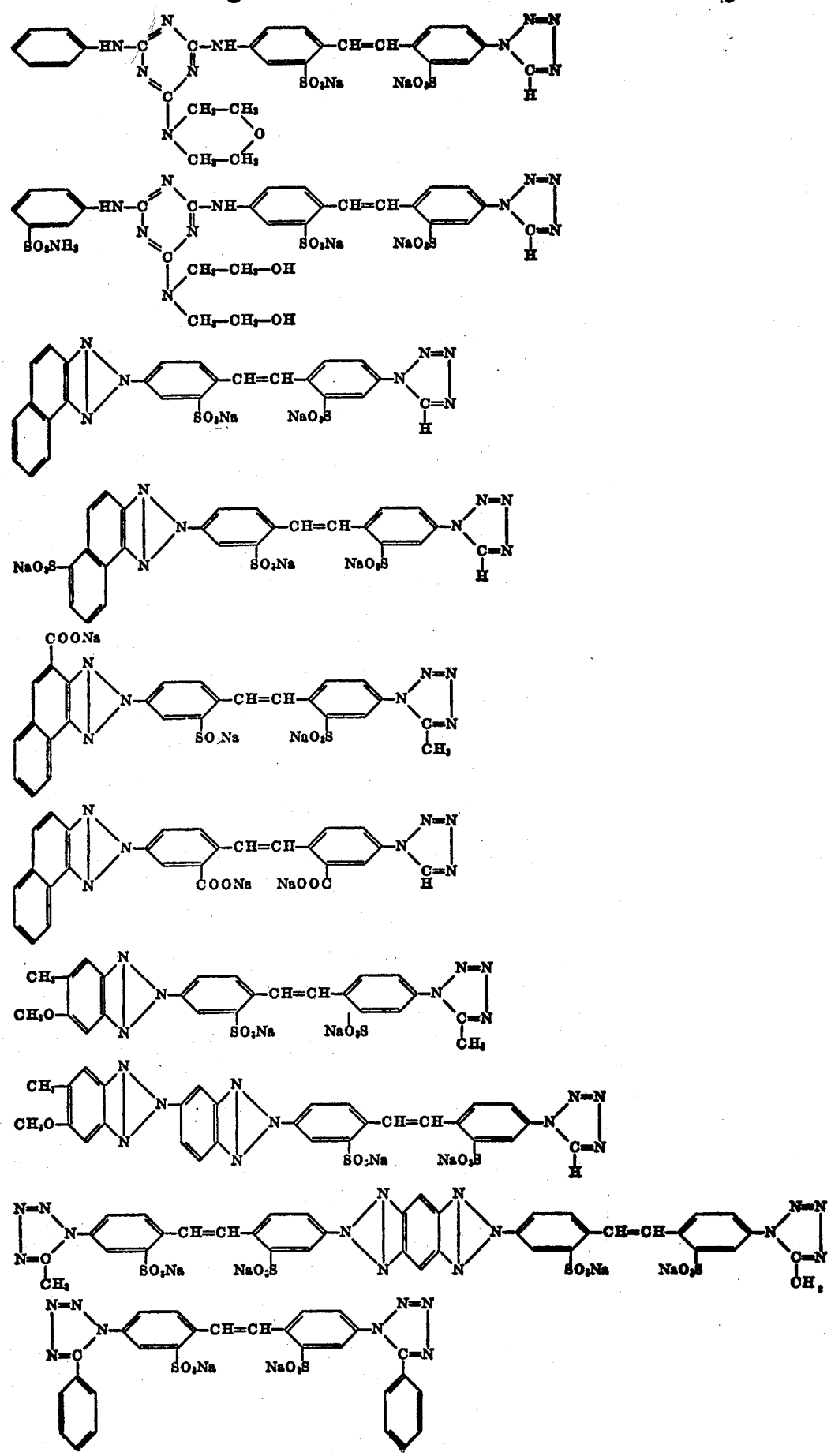

The stilbene tetrazoles to be used as brightening agents may be produced by various methods. One method of producing them consists for example in contacting aminostilbene tetrazoles of the general formula

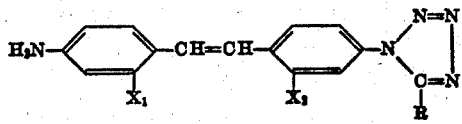

wherein $X_1$, $X_2$ and R have the above indicated significance, with agents capable of transforming the free amino group into a member of the group as defined above by Y. Suitable amino-stilbene tetrazoles may be obtained from stilbene compounds of the general formula

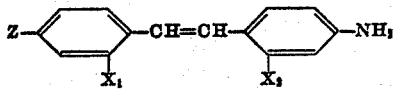

wherein $X_1$ and $X_2$ have the above significance, and Z represents a radical convertible into the primary amino group, for example, an acylamino or a nitro group, by diazotising, coupling with mono or diacyl-hydrazines in sodium carbonate solution, treating the reaction mixture with sodium hydroxide solution and contacting the tetrazole compounds formed with agents capable of converting the radical Z into a primary amino group.

A further method of producing the stilbene tetrazoles of the present invention consists in diazotising amines of the general formula

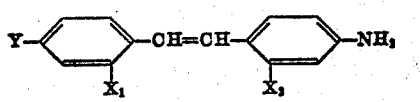

wherein $X_1$, $X_2$ and Y have the above indicated significance, and treating the diazonium compounds in alkaline medium with mono- or diacylhydrazines for example, diformylhydrazine, diacetylhydrazine or benzoylhydrazine.

The brightening agents according to the present invention can be used for improving the whiteness of a great variety of materials; there may be mentioned for example, natural or synthetic textiles such as e.g. articles of wool, natural or regenerated cellulose, cellulose acetate, polyesters, polyamides or polyacrylonitriles or the primary materials used for their production, and plastics, resins, lacquers, soaps, leather or paper. The agents are applied in conventional manner, generally in the form of solutions in water or organic solvents or in the form of dispersions. The brightening agents according to the present invention may also be employed together with detergents. The quantities required in each case may readily be established by preliminary tests.

The following examples serve to illustrate the invention without, however, limiting the scope thereof; the indicated parts are parts by weight, the percentages are also by weight, and the parts by weight and parts by volume are in the ratio of kilogram to litre.

*Example 1*

A white cotton material is treated for 20 minutes using a liquor-to-goods ratio of 20:1 in an aqueous bath containing per litre 0.04 gram of the brightening agent having the formula

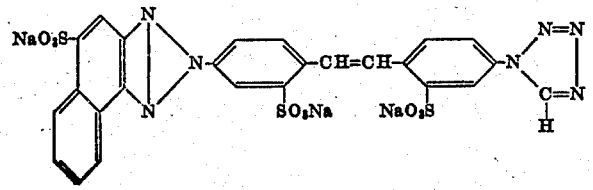

The temperature is slowly raised from 20° C. to 40° C. After rinsing and drying in the usual manner the white shade of the material is distinctly brightened.

The brightening agent is prepared as follows: 96.9 parts of the sodium salt of aminostilbene-naphthotriazole-trisulfonic acid of the formula

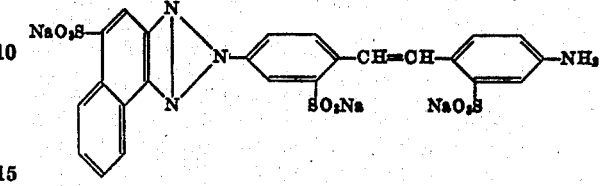

are dissolved in 10.2 parts of sodium nitrite and 400 parts of water, poured while cooling with ice into a mixture of 40 parts by volume of concentrated hydrochloric acid (d 1.18) and 300 parts of ice water and stirred for 20 minutes. After removal of the excess nitrous acid with amidosulfonic acid about 800 parts by volume of the diazo suspension thus obtained are poured with stirring at $-10°$ C. into a solution prepared from 12.8 parts of diformylhydrazine and 50 parts of common salt with the addition of 50 parts of an about 45 percent sodium hydroxide solution in 200 parts of water. The mixture thus obtained is then stirred at 20° C. until a sample treated with the sodium salt of 1-hydroxy-naphthalene-4-sulfonic acid no longer shows the presence of the violet dyestuff, and then rendered soda-alkaline with the addition of 100 parts of sodium bicarbonate. The precipitate is filtered off with suction and purified by repeated redissolution from a little boiling water with the addition of dithionite and charcoal.

*Example 2*

An unbleached cotton material is treated at 20° C. for 1 hour in a bleaching solution, using a liquor-to-goods ratio of 20:1, containing per litre 2 grams of active chlorine and 0.1 gram of the brightening agent of the formula

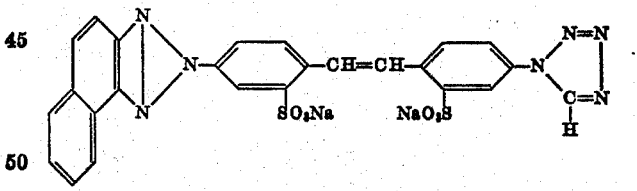

After rinsing and drying, the cotton material shows a pure white shade which appears brighter than is the case without the application of the brightening agent.

For the preparation of the bleaching solution 500 parts by volume of a chlorine solution containing per litre 4 grams of active chlorine are treated with 300 parts by volume of a buffer solution prepared from 500 parts by volume of 2 N sodium carbonate solution, 100 parts by volume of N/10 hydrochloric acid and 400 parts by volume of distilled water; the mixture is then adjusted with hydrochloric acid to pH 11 and made up to 1000 parts by volume with distilled water.

The brightening agent used is prepared as follows: A solution of 35 parts of common salt in 140 parts of water is treated with 35 parts by volume of an about 45 percent sodium hydroxide solution and then cooled to $-10°$ C. with a mixture of ice and common salt. After dissolving 8.8 parts of diformylhydrazine in this mixture, there is rapidly added with stirring at $-10°$ C. to $-15°$ C. the orange-yellow diazo paste obtained by dissolving 44.4 parts of the sodium salt of 4-nitro-4'-aminostilbene-2,2'-disulfonic acid in 300 parts of water, addition of 7 parts of sodium nitrite, stirring the mass into a mixture of 27.5 parts of hydrochloric acid (d 1.18) and 50 parts of ice, diazotizing at 0–5° C. for a half hour and filtering with suction the diazo compound.

Immediately upon introduction of the diazo paste, the deep brown solution is treated with 40 parts of sodium bicarbonate and rapidly heated to 15° C. The reaction mixture is stirred for a further 5 minutes after the coupling is completed, then again treated with 35 parts by volume of an about 45 percent sodium hydroxide solution while cooling with ice, stirred at room temperature for 6 hours, treated with 40 parts of sodium bicarbonate and finally stirred for another half hour.

The precipitate thus formed is filtered off with suction, the moist product is introduced into a boiling mixture of 60 parts of iron powder, 20 parts of glacial acetic acid and 200 parts of water and then reduced at 95° C. for ½ hour. The reaction mixture is then rendered soda-alkaline and filtered hot. The residue is boiled out three times with water. 800–900 parts by volume of the warm filtrate thus obtained is treated with 15 percent common salt and stirred until cold. By filtration with suction and drying, the sodium salt of 4-amino-4'-[1-tetrazolyl-(1,2,3,4)]-stilbene-2,2'-disulfonic acid is obtained in the form of yellow crystals.

46.7 parts of the sodium salt of 4-amino-4'-[1-tetrazolyl-(1,2,3,4)]-stilbene-2,2'-disulfonic acid are partly dissolved in a solution of 7 parts of sodium nitrite in 600 parts of water and stirred at 0° C. into a mixture of 27.5 parts of concentrated hydrochloric acid and 100 parts of ice. The mixture is diazotized while cooling with ice for ½ hour and the diazo suspension then stirred into a suspension of 15 parts of β-naphthylamine in 13 parts by volume of concentrated hydrochloric acid and 400 parts of ice and water. The mixture is rendered acid with 20 parts of soda and 22 parts of sodium acetate, stirred until the coupling is completed, the hot product is then treated with 10 percent common salt and finally cooled. The dyestuff thus formed is thereupon filtered off, dissolved in 600 parts of boiling water and treated at 90–95° C. with a solution of 62 parts of crystalline copper sulfate in 140 parts by volume of concentrated ammonia and 140 parts by volume of water. The initially red mixture is stirred at this temperature until a drop of the solution shows on filter paper instead of a red a light brownish colour. The product crystallizing out from the warm reaction mixture is filtered off, dissolved in a dilute sodium carbonate solution, decoppered with sodium sulfide and finally salted out from the filtered solution with a saturated sodium chloride solution. After filtration with suction and drying, the brightening agent is obtained in the form a light yellow crystalline powder.

*Example 3*

A white or light yellowish fibre material from the polycondensation product of ε-caprolactam is treated using a liquor-to-goods ratio 1:30 in a bath containing per litre 0.01 gram of the brightening agent having the formula

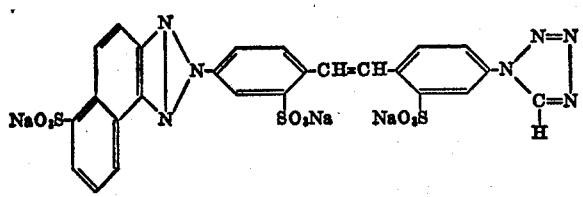

and adjusted to pH4 with acetic acid. The initial temperature of the bath of about 15° C. is slowly raised to 90–95° C. The fibre material is treated at 90–95° C. for about 10–20 minutes and then rinsed and dried; it shows thereafter a strong neutral-white brightening effect.

The brightening agent is prepared as follows: 46.7 parts of the sodium salt of 4-amino-4'-[1-tetrazolyl-(1,2,3,4)]-stilbene-2,2'-disulfonic acid are diazotized as described in Example 2 and the diazo suspension is stirred while cooling with ice into a solution of 25 parts of the sodium salt of 2-aminonaphthalene-sulfonic acid in 300 parts of water treated with 14 parts of sodium carbonate and 14 parts of sodium acetate. After the coupling is completed, the reaction mixture is heated to 90–95° C., treated with 20 percent of common salt and stirred until cold. The dyestuff thus formed is filtered off with suction, dissolved in 1000 parts of hot water, made soda-alkaline, treated and stirred at 90–95° C. with a solution of 62 parts of crystalline copper sulfate in 140 parts by volume of water until a drop of the solution shows on a filter paper instead of a red a light brownish colour. The ammonia is then boiled out and the hot solution filtered; the hot filtrate is treated with sodium sulfide and charcoal, again filtered hot and the filtrate which is now free from copper is finally clarified with little sodium dithionite. Upon addition of 120 parts of common salt at 80–90° C. the product which precipitates is filtered off with suction while hot. By repeated dissolution in hot water, treatment with common salt and filtration with suction in the hot, the aforesaid brightening agent is obtained in the form of a crystalline, greenish yellow powder.

We claim:
1. Stilbene tetrazoles of the general formula

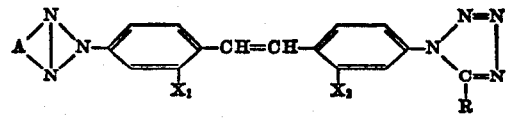

wherein R is a member selected from the group consisting of hydrogen and lower alkyl, $X_1$ and $X_2$ represent independently of each other a member of the group consisting of hydrogen, sulfonyl, the carboxyl group, and the sulfonamide group, whereas A stands for an aromatic carmbocyclic radical in which two vicinal carbon atoms of a six-membered aromatic ring form part of the 1:2:3-triazole ring, said aromatic carbocyclic radical being selected from the group consisting of the benzene and naphthalene series.

2. The stilbene tetrazole of the formula

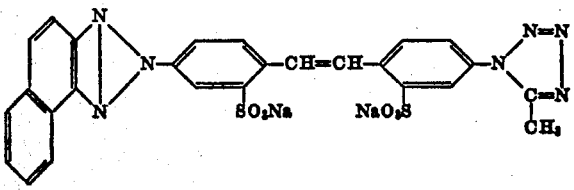

3. The stilbene tetrazole of the formula

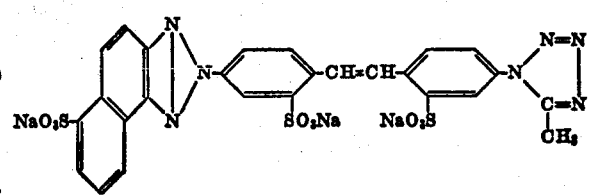

4. The stilbene tetrazole of the formula

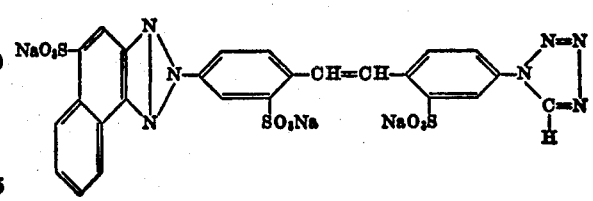

5. The stilbene tetrazole of the formula
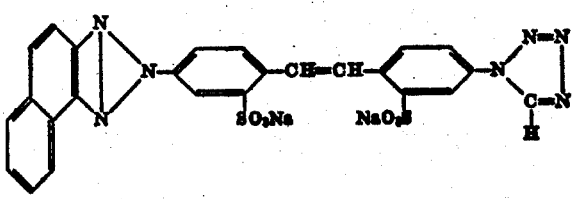
6. The stilbene tetrazole of the formula
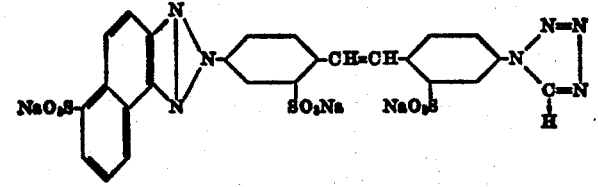
No references cited.